Feb. 8, 1938.          P. M. BOURDON          2,107,595
                      PRESSURE INDICATOR
                    Filed May 5, 1936          2 Sheets-Sheet 1
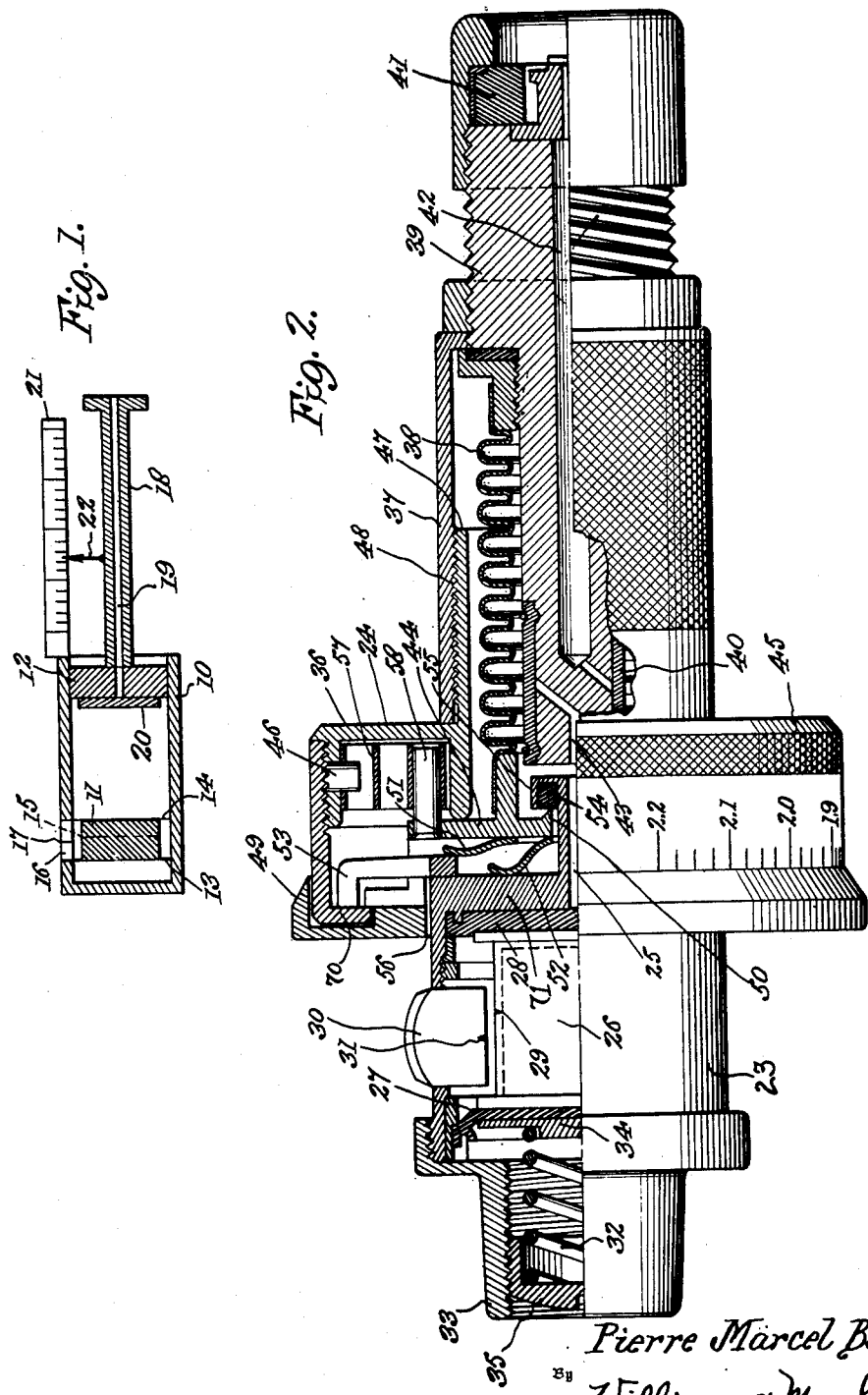
Inventor
Pierre Marcel Bourdon
By Wilkinson & Mawhinney
Attorneys.

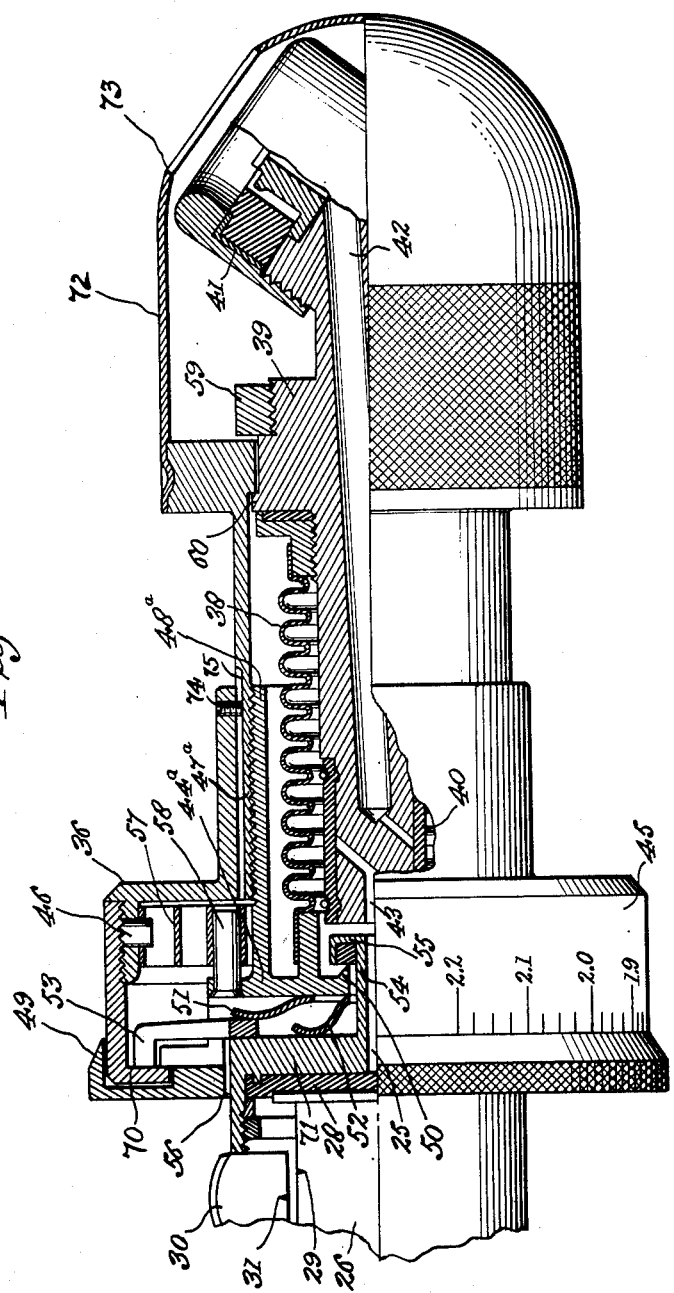

Patented Feb. 8, 1938

2,107,595

UNITED STATES PATENT OFFICE 2,107,595

PRESSURE INDICATOR

Pierre Marcel Bourdon, Paris, France, assignor to Michelin et Cie., Clermont-Ferrand, France, a corporation of France Application May 5, 1936, Serial No. 77,914
In France May 17, 1935

9 Claims. (Cl. 73—110)

The present invention relates to improvements in pressure indicators.

For measuring air pressure in tires it is customary, up to the present time, to use indicators which frequently are not sufficiently accurate or are subject to disarrangement or, as it is necessary to hold the gauge on the tire during the reading, the user is obliged to stoop over the tire for a long time. Some of the gauges now employed have several of the above named faults.

The present invention has for its object a pressure indicator overcoming these defects. This device permits taking from a tire a very small quantity of air, then measuring exactly the pressure of this air in the device after it has been withdrawn from the tire, the pressure being determined by modifying the volume of the air enclosed in the device and comparing the pressure with a predetermined pressure.

A further object of the invention is to provide an easily handled and operated pressure gauge of a high degree of sensitivity.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a central vertical section of a device illustrating the principle employed in the present invention.

Figure 2 is a side elevation of a gauge with parts broken away, and

Figure 3 is a side elevation of a modification of the device shown in Figure 2 with parts broken away.

Referring now to Figure 1 a cylinder 10 is provided with movable pistons 11 and 12. Piston 11 is preferably suspended by means of elastic membranes 13 and 14 on its two faces so as to permit the displacement of the piston without friction. The piston 11 is further provided with an index line 15 on the edge thereof and the cylinder 10 has a window 16 let into it opposite the piston 11. The window 16 is provided with an index line 17 which acts as a reference line for the index 15 on the movable piston. The other piston 12 is provided with an operating rod 18 which extends out of the cylinder 10. The piston 12 and its rod 18 have the duct 19 extending from the inside of the cylinder to the outer end of the operating rod. The outer end of the rod 18 is adapted to receive air as from a valve stem of the tire. Air so received passes through the rod and piston 12 into the cylinder 10 where it is retained by the check valve 20. This valve 20 is preferably of a very sensitive type so that pressure within the cylinder 10 will equal that in the source of pressure. Air in this cylinder 10 will act on the piston 11 to displace it. The degree of displacement is observable with reference to the line 17 in the window 16. To read the pressure of the air thus taken the piston 12 is moved so as to increase or decrease the volume of the air and so change its pressure. The volume is changed to bring the index lines 15 and 17 into coincidence, the degree of change necessary to accomplish this being measured by the amount of the scale 21 traversed by the indicating hand 22 as the piston 12 is moved. This scale 21 may be calibrated in terms of pressure for any particular strengths of the membranes 13 and 14.

If in this device the pistons 11 and 12 be in their initial determined positions and air under a known pressure is introduced into the cylinder the amount of movement of the piston 12 required to bring the indexes 15 and 17 opposite one another may be marked on the scale as the pressure of the air being measured. In this way a series of known pressure values may be marked off on the scale so that readings may be taken directly in terms of pressure. Then to determine an unknown pressure it is only required to place the interior of the cylinder 10 into communication with the source of pressure then withdraw the device and move the piston 12 until the index lines 15 and 17 coincide, when the index hand 22 will indicate on the scale 21 the pressure sought. The operation of this device depends on the law of Mariotte, that it is possible to measure the pressure of air by varying its volume.

It will be seen that it is of the greatest importance that the valve 20 closes immediately that air is introduced into the device and that it permit that the air so introduced be a constant function of that of the air of which one desires to measure the pressure.

Having described the principle of the invention Figures 2 and 3 show specific embodiments thereof. Referring now particularly to Figure 2 the device is formed of a closed cylinder which comprises two principal parts 23 and 24; the part 23 being displaceable longitudinally with respect to the part 24 and the interior members of these two parts communicating by the conduit 25. Part 23 contains a very light cylindrical piston 26 held by the two rubber membranes 27 and 28 fixed to the side walls of the part 23. The piston 26 is provided with an index 29 so that the movement of the piston is observable through a window 30 let into the side of the part 23. A reference line 31 is placed on the window 30 to furnish a measure of the degree of movement of the piston 26 and to furnish a standard with reference to which the index 29 may be moved. In addition to the resistance of the membranes 27 and 28 the piston 26 is provided with a spring 32 held in a cap 33 and bearing against the membrane 27 through a plate 34. The tension of the spring 32 is adjustable by means of the nut 35 which engages the threads on the inner side of the cap 33.

The part 24 of the device is composed of two members 36 and 37 relatively movable with respect to one another so as to vary the volume of a quantity of air therein contained. The part 37 is provided with an air-tight membrane 38 which is extensible longitudinally. The member 37 has also a stem 39 which carries at its inner end a valve 40 of the type described in the copending application Serial No. 17,365 filed April 19, 1935 by the same inventor, which consists in an elastic sleeve stretched around the end of the stem. The outer end of the stem 39 is adapted to fit over the valve stem of a pneumatic tire and has the rubber washer 41 to form a seal with the end of such valve stem. The stem 39 is likewise provided with a longitudinal axial duct 42 which communicates with the underside of the valve 40. Communication with the interior of the cylinder is obtained through the duct 43 likewise communicating with the underside of the valve 40.

Air entering through the duct 42 opens the valve and passes through the duct 43 into the interior air chamber. This chamber is formed by the extensible membrane 38 which is attached at one end to the stem 39 and at the other end to the movable collar carrying disc 44. Pressure of gas in this chamber is transmitted to one side of the membrane 28 through the passage 25 and acts to displace the piston 26 against the force of the membranes 27 and 28 and the spring 32.

The relative longitudinal movement of the parts 36 and 37 is obtained by rotation of the drum 45 which is drivingly connected with the member 36 by the set screw 46. The member 36 is in turn provided with an extended sleeve portion 47 which is externally threaded and cooperates with the internal threads of the sleeve 48 of the member 37. These threads are preferably coarse so as to give a large amplitude of longitudinal movement between the two parts. The rotation of the drum 45 may be measured by reference to the fixed indicator 49. For this purpose the exterior of the drum is graduated. The fixed indicator 49 is a part of the disc 44 which holds one end of the extensible membrane 38. The disc 44 also acts through the flange 50 to form an exhaust valve for relieving pressure in the chamber after a reading has been taken. Normally the flange 50 and the whole disc 44 are urged away from the member 23 by the springs 51 and 52; the spring 51 acting also to hold the brake 53 against the inner downturned flange 70 of the drum 45 and the spring 52 acting against the inner wall 71 of the member 23 to exert a direct pressure against the flange 50. The member 23 is formed with an extension 54 which has at its innermost end an external channel 55 in which is placed an elastic ring. The exhaust valve then works as follows: the member 23 is pressed inward with respect to the member 24 whereupon the springs 51 and 52 are flexed, the flange 50 leaves the channel 55 and air escapes around the channel and out of the exhaust duct 56. At the same time, the brake 53 is released and the drum is returned to its zero position by the coil spring 57 which is wound as the drum 45 is rotated in taking a reading. The outer end of this coil spring 57 is secured by means of the set screw 46 which serves also to connect the drum 45 with the member 36. The inner end of the coil spring is provided with an eye and is secured to the disc 44 by means of the pin 58. The function of the apparatus is then as follows:

The apparatus calibrated as has been indicated in connection with Figure 1 is placed in the condition shown in Figure 2, that is, the zero position with the member 36 abutting the end of the sleeve 37, reducing the air compartment to its smallest dimensions. The end of the stem 39 is placed on the valve of the tire of which we wish to measure the pressure so that washer 41 comes in contact with the end of the valve so that the interior of the valve communicates with the channel or duct 42. The device is held in this position for several seconds to permit air at the pressure of the tire to fill the chamber. The air passes into the apparatus by the duct 42 and the valve 40 and passing through the conduit 25 displaces the piston 26 by acting against the membrane 28. Once air has been taken in this manner the apparatus is lifted clear of the tire and then the drum 45 rotated until by varying the volume of the chamber in which the air is enclosed and a consequent change in the pressure exerted on the piston 26 the indicators 29 and 31 are made to coincide. At this point the fixed indicator 49 will point to the pressure of the tire on the scale of the drum which scale has been marked off to read in pressure as a result of the calibration of the instrument. To exhaust the apparatus (which is indispensable in order to take a new reading) it is only required to thrust the member 23 toward the member 24 which opens the exhaust valve and also returns the drum to zero position.

In order to make sure that no reading will be taken before the drum has been returned to the zero position the modification shown in Figure 3 is employed. In this form the drum 45 is connected with a cap 72 which fits over the outer end of the stem 39 which is bent out at an angle from the axis of the stem. The cap 72 has an opening 73 at one side such that it will register with the end of the stem 39 in only one position of the drum 45, namely, the zero position. It will also be noted that in this modified device the drum 45 is slidably attached to the internally threaded sleeve 47a but the sleeve is free to move longitudinally with respect to the drum. The sleeve 47a fits about and engages with the threads of the externally threaded sleeve 48a which is here formed as an extension to the disc 44a, so that rotation of the sleeve 47a causes longitudinal movement between the two sleeves. Thus, rotation of the drum 45 produces longitudinal movement of the sleeve 47a but this movement is not transmitted to the drum because of the groove 75 and pin 74 arrangement. The longitudinal movement of the sleeve 47a is transmitted to the stem 39, which carries one end of the diaphragm 38, through the thrust ring 59 and the shoulder 60 of the stem. In other respects this form is substantially identical to that shown in Figure 2.

It is to be remarked that the good results obtained with this apparatus are due in great part to the excellent functioning of the valve 40 which is a valve without inertia, which permits the introduction of the required volume of air independently of the length of time during which contact with the tire is maintained, and which closes instantly when the apparatus is removed from the tire. It will be noted that this is a form of valve in which the pressure on one side of the valve augments the elastic tension of the valve to keep it closed. This results in a very rapid closing of the valve when the apparatus is removed from the tire.

The results obtained with this apparatus are of such exactness that readings can be taken within five grams of pressure.

It is obvious that various changes and modifications may be made in the details of construction and design of the above specifically described embodiment of this invention without departing from the spirit thereof, such changes and modifications being restricted only by the scope of the following claims.

The device has only been referred to as an indicator for the pressure of air in pneumatic tires but it will of course be understood that this device is adaptable to measuring pressures of gases in any form.

What is claimed is:

1. A gas pressure indicator having a fixed hollow body portion, a relatively movable hollow body portion, coacting threads on each of said body portions whereby on relative rotation a relative longitudinal movement is imparted to said portions, an expansible gas chamber within said body portions the volume of which is changed by the longitudinal movement between said body portions, means including a check valve for introducing air into said gas chamber through said fixed body portion, a second chamber communicating with said expansible gas chamber, a pressure comparing member comprising an elastically supported piston in said second chamber and movable under force of air in said gas chamber, means for disclosing movement of said piston, and means on said fixed and movable body portions indicating the degree of relative movement therebetween, the degree of movement furnishing an index of the change in volume of the expansible gas chamber produced, said pressure comparing member having a known resistance to movement so that the change in volume of the gas chamber required to produce a predetermined movement of said piston is a constant function of the pressure to be measured.

2. A gas pressure indicator comprising a hollow member having a fixed stem with an air duct therein, a check valve at the inner end of said duct, a nozzle at the outer end of said stem and said duct opening at said nozzle, an extensible cylindrical diaphragm secured at one end to said stem, a drum having a sleeve extension relatively movable with respect to said stem, coacting threads on said sleeve extension and said member to change relative rotation of said sleeve and member into relative longitudinal motion thereof, a non-rotating connector between said drum and the other end of said extensible diaphragm so that on rotation of said drum the diaphragm is extended and its volume increased, said connector, diaphragm and stem bounding a gas chamber into which the said check valve admits air, a cylinder yieldably attached to said connector communicating with said chamber, a piston of predetermined resistance to movement in said cylinder and movable under force of pressure in said chamber, indicating means for showing movement of said piston from its normal position, a fixed reference member carried by said non-rotatable connector to show the amount of relative rotation of said drum and indicating thereby the volume change of said gas chamber, and said yieldably attached cylinder forming with said connector a releasable exhaust valve therebetween for exhausting said gas chamber.

3. A gas pressure indicator comprising a dilatable gas chamber, means for changing the volume of said chamber, means for introducing gas into said chamber, a second chamber in communication with said dilatable chamber, movable means of known resistance in said second chamber and movable under pressure of gas in said dilatable chamber by an amount equal to the ratio between the known resistance and the pressure of the gas, means for indicating the amount of movement of said movable means, and said volume changing means having an index of the degree of change of volume of said chamber required to change the pressure of gas to produce a definite movement of said movable means, said degree of change of volume being proportional to the pressure being measured.

4. A gas pressure indicator having a gas chamber of variable volume, a gas introducing connection for said chamber, manually operable means for varying the volume of said chamber, said means carrying an index of variation of volume made, a second chamber in communication with said chamber of variable volume, and an elastically supported movable member of known resistance in said second chamber and movable under pressure of gas in said chamber of variable volume by an amount proportional to the relation between said known resistance and the pressure of the gas, said movable member having thereon an index of movement to indicate the relation between the pressure of said gas and said known resistances, the index of variation of volume bearing a definite relation to the pressure being measured when the volume of the chamber has been adjusted to produce a pressure of gas sufficient to cause a definite movement of said movable member.

5. In combination with a gas chamber of variable volume, calibrated manually movable members for varying the volume of said chamber, a second chamber in communication with said chamber of variable volume, an elastically supported piston of known resistance in said second chamber and movable under force of gas in said chamber of variable volume by an amount proportional to the ratio between the known resistance and the gas pressure in the said chamber, means for indicating the amount of displacement of said piston, a gas introducing nozzle having a duct opening outwardly for communication with a source of gas, said duct terminating radially of said nozzle near its inner end, said nozzle having a second duct separated from the first and having one end opening into said chamber and the other end opening radially of the nozzle near its inner end, and an elastic sleeve tightly secured about the inner end of said nozzle covering both of the radial duct openings, the inner end of said nozzle being in said gas chamber whereby the pressure of gas in the chamber is exerted on said sleeve to hold it against said openings, the sleeve adapted to open only under force of gas coming from the gas source to permit flow into the said chamber.

6. A gas pressure indicator comprising a stem having an air duct therein, a check valve at the inner end of said duct, a laterally offset nozzle at the outer end of the stem and duct, an extensible diaphragm secured at one end to said stem, a rotatable member about said diaphragm and stem and having a side opening to register in one position with said offset nozzle, a non-rotatable connector between said rotatable member and the other end of said diaphragm, coacting threads on said rotatable member and said non-rotatable connector whereby relative rotation produces relative longitudinal movement thereof, means for carrying said stem longitudinally with said rotatable member to transmit movement of said member to the extensible diaphragm, a chamber in communication with the inside of said diaphragm, means including a member of known resistance movable under force of pressure of gas in said diaphragm and chamber and means indicating movement of said member of known resistance from its rest position, a drum drivingly connected to said rotatable member, a fixed reference member carried by said non-rotatable connector to show the amount of rotation of said drum relative to said connector thereby to show the volume change of said diaphragm, and zeroizing means for said rotatable member to return the diaphragm to a predetermined position, said opening of the said rotatable member registering with said offset nozzle to permit access thereto only in the zeroed position of said rotatable member.

7. In a gas pressure indicator having a gas chamber of variable volume, means with coacting threads for varying the volume of said chamber, pressure introducing means, means of known resistance movable under force of pressure of gas in said chamber of variable volume, means disclosing the movement of said means of known resistance whereby to indicate that the pressure of gas in said chamber of variable volume is sufficient to overcome said known resistance, spring urged interacting valve members whereby the chamber of variable volume is normally sealed, said valve members being separable to vent said chamber by flexing the spring, spring urged braking means to prevent back movement of said means for varying the volume of the chamber of variable volume, zeroizing means for said means for varying the volume of the chamber of variable volume, said zeroizing means, being prevented from operation by said braking means, said braking means releasable by flexing its spring to permit operation of said zeroizing means, said valve members and said braking means releasable by the same action to flex the spring of each whereby simultaneously to vent said gas chamber of variable volume and return said gas chamber to its initial zero position.

8. In a gas pressure indicator having an extensible chamber, members with coacting threads disposed upon relative rotation to extend said chamber, indicating means on said members to show the amount of extension of said extensible chamber and thereby to indicate its volume change, means of known resistance movable under force of pressure of gas in said extensible chamber, indicating means on said means of known resistance to show departure of the same from a predetermined position under force of pressure of gas in said extensible chamber, a zeroizing spring between said members with coacting threads adapted to be wound on relative rotation of said members and adapted to return said members to a predetermined zero position, said zero position being the relative position between said members with coacting threads which places the extensible gas chamber in its initial rest position.

9. A device for measuring gas pressures comprising a chamber adapted to receive the gas, means of known resistance movable under force of pressure of gas in said chamber, movement of said means taking place in proportion to the relation between the known resistance and the pressure in the chamber, indicating means to show the position of said means of known resistance, a wall of said chamber being manually movable to change the volume of said chamber and adapted to be moved until the indicating means for the displaceable member indicates a predetermined pressure relation between the known resistance and the pressure of gas in the chamber, and indicating means for said manually movable wall adapted to show the amount of displacement of said wall required to produce the predetermined pressure relation shown by the indicating means for the displaceable member, the displacement of said movable wall being then proportional to the pressure of the gas being measured.

PIERRE MARCEL BOURDON.